(12) United States Patent
Howald et al.

(10) Patent No.: US 9,424,254 B2
(45) Date of Patent: Aug. 23, 2016

(54) SYSTEMS AND METHODS FOR NATURAL LANGUAGE GENERATION

(71) Applicant: Thomson Reuters Global Resources (TRGR), Baar (CH)

(72) Inventors: Blake Howald, Northfield, MN (US); Ravi Kondadadi, Rosemount, MN (US); Frank Schilder, Saint Paul, MN (US)

(73) Assignee: Thomson Reuters Global Resoures (CH)

( * ) Notice: Subject to any disclaimer, the term of this patent is extended or adjusted under 35 U.S.C. 154(b) by 0 days.

(21) Appl. No.: 14/177,694

(22) Filed: Feb. 11, 2014

(65) Prior Publication Data

US 2015/0227508 A1    Aug. 13, 2015

Related U.S. Application Data

(63) Continuation-in-part of application No. 13/689,194, filed on Nov. 29, 2012.

(60) Provisional application No. 61/763,247, filed on Feb. 11, 2013.

(51) Int. Cl.
*G06F 17/27* (2006.01)
*G06F 17/28* (2006.01)

(52) U.S. Cl.
CPC ................... *G06F 17/2881* (2013.01)

(58) Field of Classification Search
None
See application file for complete search history.

(56) References Cited

U.S. PATENT DOCUMENTS

| | | | | |
|---|---|---|---|---|
| 6,684,202 B1* | 1/2004 | Humphrey | ........... | G06F 17/2715 706/45 |
| 7,877,343 B2* | 1/2011 | Cafarella | ........... | G06F 17/30696 382/104 |
| 8,849,650 B2* | 9/2014 | Gopi | .................... | G06F 17/2881 704/257 |
| 2010/0293507 A1* | 11/2010 | Song | ....................... | G06Q 10/10 715/810 |
| 2011/0191276 A1* | 8/2011 | Cafarella | ........... | G06F 17/30696 706/12 |
| 2013/0132418 A1* | 5/2013 | Spangler | ....................... | 707/759 |
| 2014/0156260 A1* | 6/2014 | Zweig | ..................... | G06F 17/27 704/9 |
| 2015/0127319 A1* | 5/2015 | Hwang et al. | ..................... | 704/2 |

* cited by examiner

*Primary Examiner* — Satwant Singh
(74) *Attorney, Agent, or Firm* — Duncan Galloway Egan Greenwald, PLLC; Kevin T. Duncan

(57) ABSTRACT

A method includes receiving a corpus comprising a set of pre-segmented texts. The method further includes creating a plurality of modified pre-segmented texts for the set of pre-segmented texts by extracting a set of semantic terms for each pre-segmented text within the set of pre-segmented texts and applying at least one domain tag for each pre-segmented text within the set of pre-segmented texts. The method further includes clustering the plurality of modified pre-segmented texts into one or more conceptual units, wherein each of the one or more conceptual units is associated with one or more templates, wherein each of the one or more templates corresponds to one of the plurality of modified pre-segmented texts.

12 Claims, 8 Drawing Sheets

Automatic Metric Evaluations of Weather, Financial and Biography Domains

Human Text-Understandability Evaluations

Human Sentence Level Preference Evaluations

SYSTEMS AND METHODS FOR NATURAL LANGUAGE GENERATION

RELATED APPLICATIONS

This application claims benefit of U.S. Provisional Application Ser. No. 61/763,247, filed Feb. 11, 2013, the contents of which are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2013 Thomson Reuters.

TECHNICAL FIELD

Various embodiments of the present invention concern systems and methods for natural language generation.

BACKGROUND

Natural language generation ("NLG") is a computer implemented processing task of generating natural language text. NLG can be thought of as a translator that converts a computer based representation into a natural language representation. There are various considerations to incorporate when trying to make computer generated text sound more "natural" such as what type of text is sought to be generated (communicative goal), what entities events and relationships will express the content of that text, and how to forge grammatical constructions with the content into "natural" sounding text. These considerations are articulated in a variety of architectures. For example, Bateman and Lock (2003) summarize NLG as follows: (1) Macro Planning: determining how to structure a document (e.g., a document plan); (2) Micro Planning: determining how to phrase sentences within that document given a set of content (sentence and content planning); (3) Surface Realization: concatenating the information from (1-2) into coherent and grammatical text; and (4) Physical Presentation: document layout considerations (formatting, titles, etc.) (see J. Bateman and M. Lock (2003), "Natural Language Generation," In R. Mitkov (Ed.), Oxford Handbook of Computational Linguistics, Research in Computational Semantics, pp. 284-304. Oxford University Press, Oxford). Each one of these stages can have several subtasks and vary considerably in terms of complexity.

There are several known NLG systems: rule-based, statistical and template-based. Known rule-based NLG systems utilize domain dependent rules (e.g., the weather domain) and manipulate different stores of data to generate "natural" sounding text. The rules exist at all levels of the known system from selecting content, to choosing a grammatical output to post-processing constraints to, for example, aggregating sentences, resolving pronouns and varying content. For example, if a rule-based system were created to generate weather forecasts from numerical data, the numerical data would need to be analyzed. In addition, decisions about what content to convey based on the analysis and how to grammatically represent the content at the sentence and document level are made and implemented by hand-crafted, domain dependent rules with input from multiple experts. While these known systems do not need an existing domain corpus to create the rules, the rules are heavily dependent on a given domain and require linguistic and domain expertise to develop the rules. In other words, a criticism of rule-based systems is that despite the generated texts tending to be of an objective high quality, there is intensive reliance on human investment.

Another known system is a statistical NLG system. Known statistical NLG systems look to bypass extensive rule construction by using corpus data to "learn" the set of rules. A known statistical NLG system creates alternative generations of natural language text from the statistical rules and then chooses which alternative at a given point in a generated discourse is governed by a decision model. For example, the pCRU system, which generates weather texts, starts with a small number of relations that are trained on a corpus. Alternatives are generated and then different probabilistic methods are used to generate the natural language text (see A. Belz (2007) "Probabilistic Generation of Weather Forecast Texts" In Proceedings of Human Language Technologies 2007: The Annual Conference of the North American Chapter of the Association for Computational Linguistics (NAACL-HLT07), pp. 164-171). While known statistical NLG systems are less domain dependent and reduce the need for domain expertise, they do need training data and there is no guarantee that the natural language text is grammatically correct. Statistical systems have less of a reliance on human investment, but can be computationally expensive, depending on the type of decision model in place, and the output texts can be shorter and less natural.

A third known system is a template-based NLG system. A known template-based system creates a template where empty slots are replaced by specific information. For example, a template sentence may be "The temperature is <value>." The <value> is the empty slot where specific temperature information may be replaced. For known rule-based and statistical approaches, templates can be employed to structure the syntactic output. The use of templates avoids the need for extensive grammatical correction. The drawback is that templates from a known template-based system tend to be less interesting, less variable and less natural.

A central consideration in NLG is a concern for the adaptability of a given system to new domains. Significant human investments often need to be made to create systems from scratch. While these known systems may perform very well for a given domain, extending to alternative domains may require starting Over. Statistical approaches, while streamlining some initial investment in human resources potentially falls prey to the same concern. A goal is to find an appropriate balance between how much pre-processing of data is required and how many rules are necessary relative to achieving an appropriate level of evaluated acceptance of the generated text.

Accordingly, the inventors have recognized the necessity for additional improvements in natural language generation.

SUMMARY

The inventors propose an automated, hybrid technique for a natural language generation system. In one example, given a training corpus of target sentences, a modified sentence is created by extracting semantic terms and applying domain tags to each sentence. The modified sentences are then clustered into difference conceptual units such as cold front and warm front for weather domain sentences. Once clustered, each original sentence is related to the clustered modified sentence and reduced to a template. A ranking support vector machine (SVM) uses a number of features to train on the corpus to determine the optimal template during testing. The combination of the conceptual unit, a set of ranked templates and a given set of information constrains output selection and yields acceptable natural language texts.

Advantages of a hybrid statistical and template-based system include the advantages of each individual system. The statistical part of the system reduces human intensive rule generation while remaining robust and domain adaptable. The template-based part of the system eliminates the need for extensive grammatical correction. In addition, templates can be "learned" from a training corpus rather than generated by humus. The hybrid system minimizes, significant investments in sentence and document planning. As discussed timber in the specification, the hybrid system is capable of generating natural language texts for weather, financial and biography domains and, has been evaluated with automatic and crowd-sourced metrics.

Additional advantages and/or features of the present invention will be set forth in part in the description. It is to be understood that both the foregoing general description and the following detailed description of the present invention are exemplary and explanatory and are intended to provide further explanation of the present invention as claimed.

DETAILED DESCRIPTION OF THE EXEMPLARY EMBODIMENT(S)

The description includes many terms with meanings derived from their usage in the art or from their use within the context of the description. However, as a further aid, the following definitions are presented. A corpus includes a set of pre-segmented texts. The corpus usually includes a set of documents wherein each documents has a set of pre-segmented texts. A pre-segmented text is a string of characters that has an implied beginning and end. For example, a sentence is a string of characters that has an implied beginning (a capital letter) and an end (a punctuation mark). Other exemplary pre-segmented texts may include one or more sentences, one or more paragraphs, a whole document and the like. Each pre-segmented text has at least one semantic term. A semantic term helps determine the conceptual meaning of the pre-segmented text. For instance, assume a pre-segmented text is a sentence. While each term within a sentence has a function, some terms are more helpful in capturing the conceptual meaning such as verbs, nouns, adjectives, adverbs and the like. The objective is to extract the set of semantic terms which are helpful in determining the conceptual meaning. A domain tag is a non-hierarchical term assigned/applied to a piece of information in a given domain. For example, if the domain is financial, a financial tag may be "value" wherein every sentence that has a financial value that number value is replaced with a <value> tag. There are also domain general tags as well. For instance, a domain general tag may be <company>, <person>, and <time>. Company, person and time tags are not necessarily specific to any type of domain. Exemplary domain tags are described throughout the specification (for instance, refer to steps 204 and 206). A modified pre-segmented text has fewer characters in the string than its corresponding pre-segmented text. Each modified pre-segmented text is created by extracting semantic terms and applying domain tags to a given pre-segmented text. Exemplary modified sentences are described throughout the specification (for instance, refer to step 204). A conceptual unit is a linguistic semantic cluster formed by combining all its characteristics or particulars. For instance, given a set of sentences from a weather domain, several conceptual units may be identified such as "warm front," "cold front," "daily temperature" and the like. The semantic terms within a sentence (e.g., a type of pre-segmented text) may be beneficial in determining what other sentences are like the given sentence to ultimately form a conceptual unit. A template is a semantic representation of a corresponding pre-segmented text and modified pre-segmented text. Exemplary templates are described throughout the specification (for instance, refer to step 206). A gold template is a chosen template, for a given iteration, to which a set of templates is compared.

Exemplary System

Figure 1:
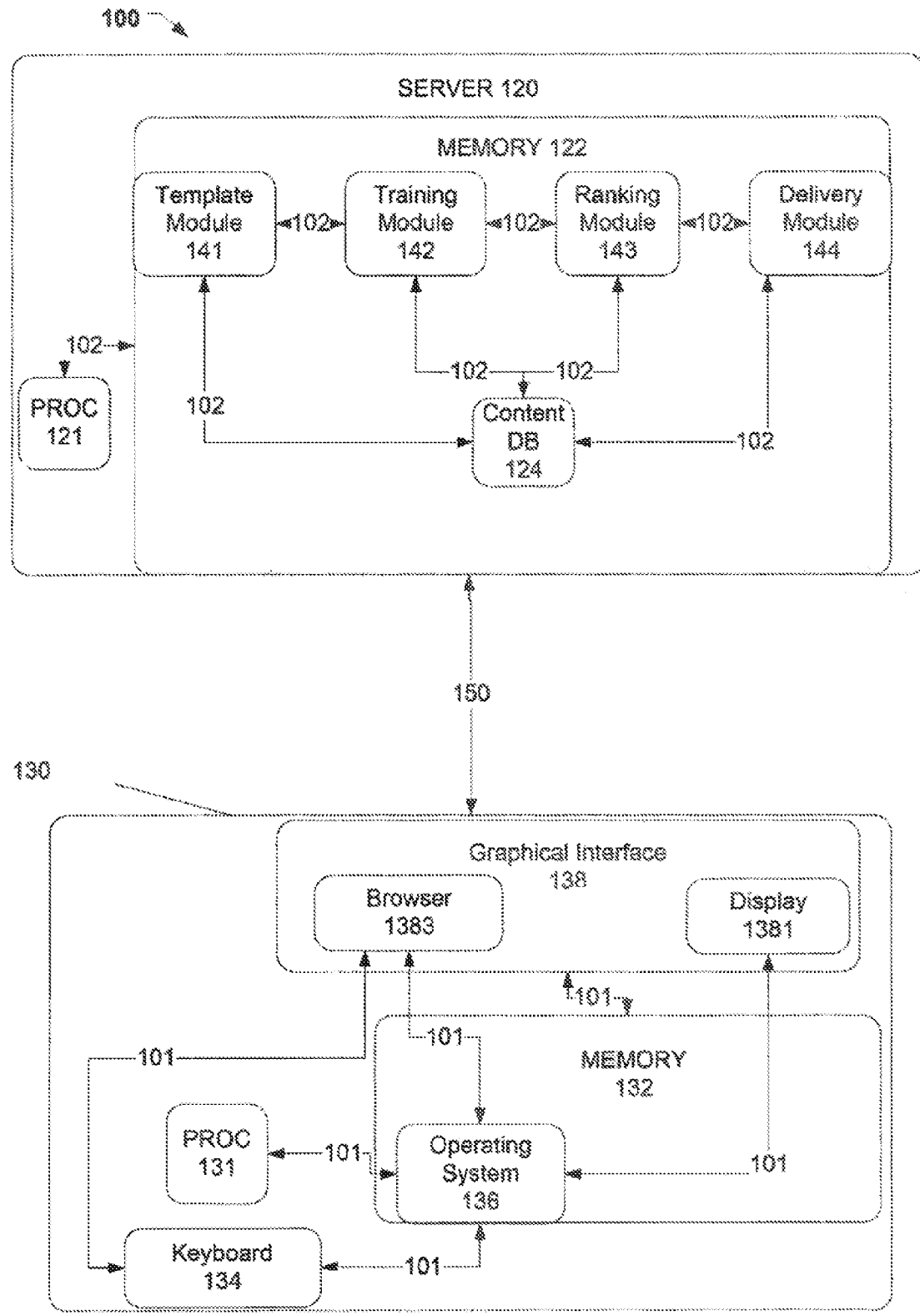
FIG. 1 is an exemplary system 100 which corresponds to one or more embodiments of the invention.

FIG. 1 shows an exemplary system 100, respectively, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal is a wireless or wireline transmission channel 150 to at least one access device, such as access device 130. For example, a wireless or wireline transmission channel 150 may be associated with a request to provide natural language text to access device 130. Server 120 includes a processor module 121 and a memory 122, wherein the memory 122 further includes a content database 124 and a program (not shown) with software modules 141, 142, 143 and 144. As shown in FIG. 1, in one embodiment, the software modules include a template module 141, a training module 142, a ranking module 143 and a delivery module 144. Details of the software modules 141, 142, 143 and 144 configured in memory 122 are discussed in further detail below. Processor module 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) within access device 130 and server 120, respectively. Processor module 121 may use computer bus 102 to queue a request that is to be transmitted through a signal, from server 120, via a wireless or wireline transmission channel 150 and is then ultimately received by the processor module 131 through the utilization of computer bus 101. Generally, server 120 transmits the signal via a wireless or wireline transmission channel 150 to at least one access device, such as access device 130.

Processor module 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores software modules 141, 142, 143 and 144 and a content database (DB) 124.

Content database 124 takes the exemplary form of one or more electronic, magnetic, and/or optical data-storage devices. Content database 124 includes a corpus of pre-segmented texts such as sentences, documents relating to the corpus, modified pre-segmented texts, semantic terms, domain tags, templates, calculations, and/or any other data needed to use system 100 and implement method 200 (see FIGS. 2 and 2A). The documents may be related to legal, financial, scientific, weather, biographical, tax and/or accounting information. The content and/or a subset of the content within the content database 124 may be subscriber content. Subscriber content includes content and related data for controlling, administering, and managing pay-as-you-go and/or subscription based access. For instance, a user may have to subscribe to a financial information retrieval service (e.g., Thomson One™) (not shown). The content is stored in the content database 124 and cannot be accessed until a set of user credentials are authenticated. For instance, user credentials may be a user name and associated password. Once the credentials are successfully authenticated on server 120, a delivery signal, associated with at least one updated authority record, is transmitted via the wireless or wireline transmission channel 150 to access device 130. For purposes described herein, successfully authenticating a set of user credentials means the user credentials were accepted by an authentication system (not shown but well known to those skilled in the art).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone. APPLE® iPad, and/or any other device capable of providing an effective user interface with a server and/or database. Specifically, in this exemplary embodiment, access device 130 is a personal computer which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines which one or more of the software modules 141, 142, 143 and 144 needs to be utilized, engages the given software module through the signal via a wireless or wireline transmission channel 150, accepts the software module output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When one or more of the software modules 141, 142, 143 and 144 are initiated, a display 1381 is defined in memory 132 and rendered on graphical interface 138. Upon rendering, the graphical interface 138 presents the data/results in association with the set of instructions from the delivery module 144 as further discussed herein.

Exemplary Methods as Conducted by System 100

Figure 2:
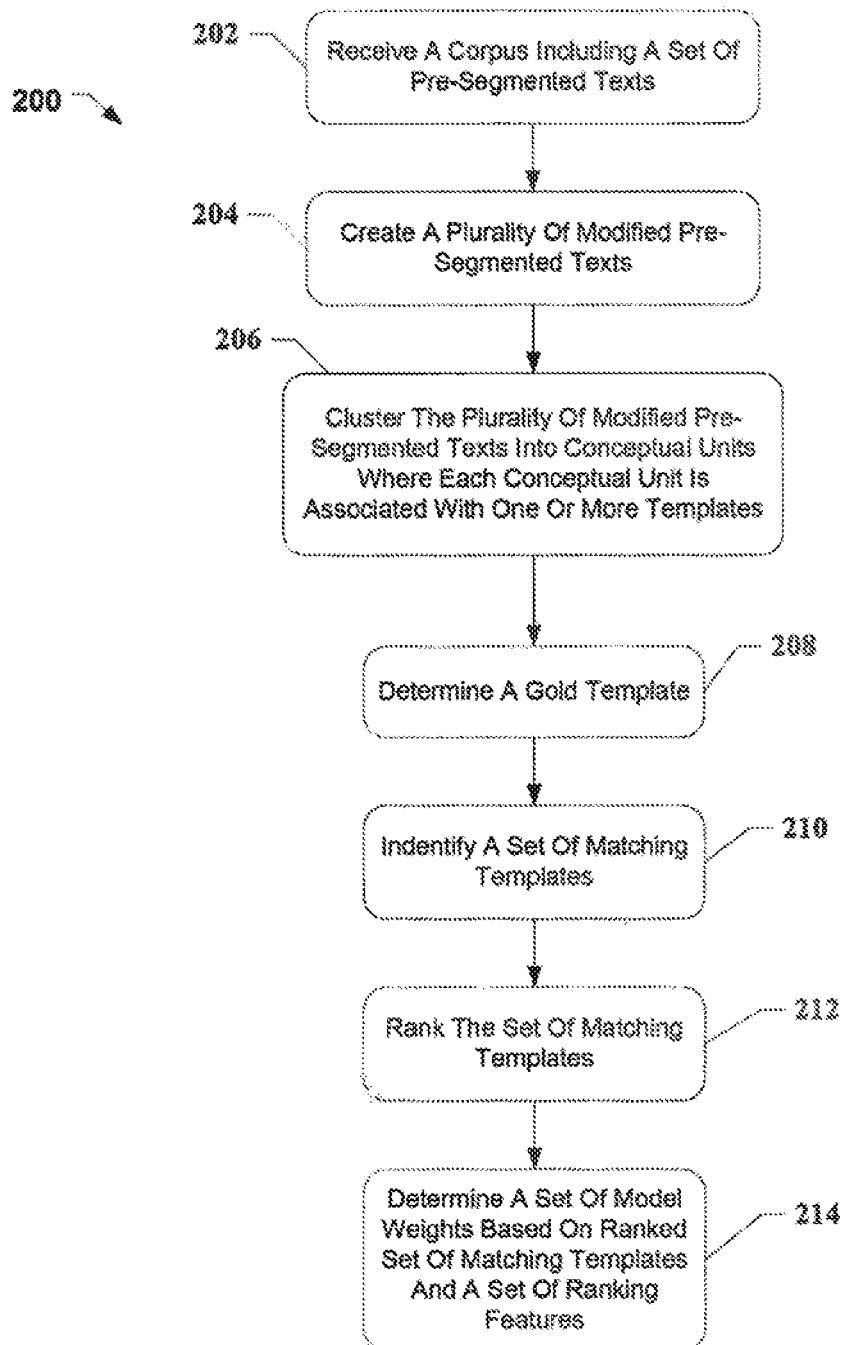
FIG. 2 outlines an exemplary method 200 which corresponds to one or more embodiments of the invention.
Figure 2A:
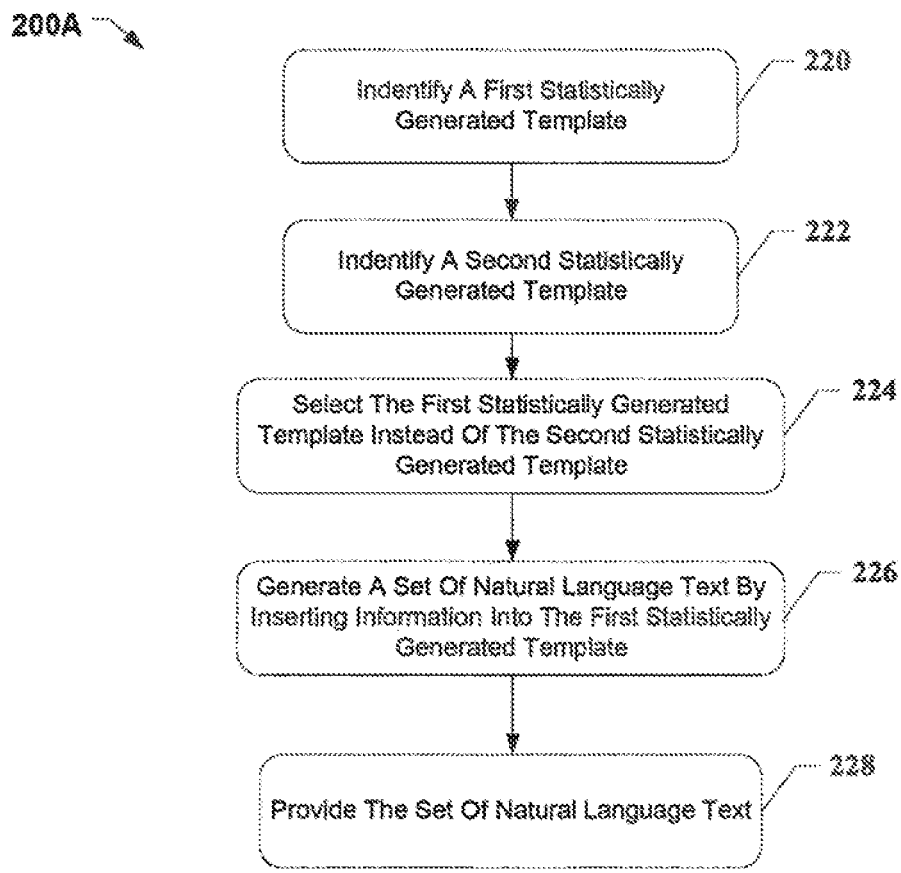
FIG. 2A outlines an exemplary method 200A which corresponds to one or more embodiments of the invention.

Referring now to FIGS. 2 and 2A, system 100 is configured to implement methods 200 and 200A. Methods 200 and 200A include functional blocks 202-214 and 220-228, respectively. These functional blocks are steps that perform actions including assignments, decisions, assessments and other like functions. In the following exemplary embodiments for methods 200 and 200A, an example of pre-segmented text is a sentence and a set of pre-segmented texts is a set of sentences. In addition, the domain unless otherwise specified is the financial domain.

In step 202, a corpus is received by the template module 141. A corpus includes a set of documents wherein each document has a set of sentences. The corpus and associated sentences are stored in content database 124. Once the corpus and corresponding sentences have been received and stored, the process moves to step 204.

In step 204, a plurality of modified sentences for the set of sentences is created using template module 141. In particular, creation of the modified sentences includes: 1) extracting a set of semantic terms for each sentence within the set of sentences and 2) applying at least one domain tag for each sentence within the set of sentences. To illustrate, consider the following exemplary sentences from a corpus within a financial domain:

1. The consensus recommendation for the financial services peergroup is a buy.
2. T. Rowe Price led the group last quarter with a 3.6% average per share price increase.
3. The increase is projected to level of during the current quarter.

The goal in creating a modified sentence is to provide a semantic representation of the original sentence. A semantic representation captures the conceptual meaning. While each term within a sentence has a function, some terms are more helpful in capturing the conceptual meaning such as verbs, nouns, adjectives, adverbs and the like. The objective is to extract the set of semantic terms which are helpful in determining the conceptual meaning. One skilled in the art recognizes that there are several methods to providing a semantic representation. For example, in one embodiment, discourse representation structure (DRS) provides an appropriate form for semantic representation. DRSs are formal semantic representations of sentences (and texts) that are a part of discourse representation theory (see H. Kamp and U. Reyle (1993) "From Discourse to Logic An introduction to Model-theoretic Semantics of Natural Language, Formal Logic and DRT" Kluwer, Dordrecht). Discourse representation theory uses DRS to represent a hearer's mental representation of a discourse as it unfolds over time. There are two critical components to a DRS: 1) a set of discourse referents representing entities which are under discussion, and 2) a set of DRS conditions representing information that has been given about discourse referents. Consider the following sentence: "A farmer owns a donkey." The DRS of the sentence can be notated as [x,y: farmer (x), donkey (y), owns (x,y)]. What the DRS illustrates is two discourse referents, x and y, and three discourse conditions farmer, donkey, and owns, such that the condition farmer holds of x, donkey holds of y, and owns holds of the pair x and y. Informally, the DRS is true in a given model of evaluation if and only if there are entities in that model which satisfy the conditions. So, if a model contains two individuals, and one is a farmer, the other is a donkey, and the first owns the second, the DRS is true in that model. Subsequent sentences within the discourse may result in the existing DRS being updated. Consider subsequent sentence: "He chases it." Speaking the subsequent sentence after the first results in the DRS being updated as follows (assuming a way to disambiguate which pronoun refers to which individual): [x, y: farmer (x), donkey (y), own (x,y), chase (x,y)].

In a preferred embodiment, the method for providing a semantic representation may be to extract all terms from the given sentence except those identified in a list of stop terms. An exemplary list of stop terms may include terms such as "a," "the," "for," "is," "to," "with," "during," "per" and any numerical value. If any of these exemplary stop terms are present in a given sentence they are not extracted. Applying the above-mentioned stop terms to the exemplary sentences, the following stop word semantic representations are formed:

1.  consensus-recommendation-service-financial-peer-group-buy
 2. T. Rowe Price-group-lead-last-quarter-price-share-average-increase
 3. increase-project-off-current-quarter In addition, during the formation of the semantic representation, at least one domain tag is applied for each sentence within the set of sentences. This application step is executed by the template module 141. A domain tag is a non-hierarchical term assigned to a piece of information in a given domain. For example, if the domain is financial, a financial tag may be "value" wherein every sentence that has a financial value that number value is replaced a <value> tag. The previous example is an example of a domain specific tag. There are also domain general tags as well. For instance, a domain general tag may be <company> or <time>. A time or company tag is not necessarily specific to any type of domain. Tagging a sentence allows for a more general semantic representation which becomes more helpful in the clustering step 206. Referring hack to the stop term semantic representations, any domain specific tags are also being applied to sentences during the semantic representation formation. For example, the creation of a modified sentence for sentence (2) "T. Rowe Price led the group last quarter with a 3.6% average per share price increase," includes extracting semantic terms and applying domain general tags. The extracting and applying steps may be done in sequence or in parallel. Either way, the extracted semantic terms are: T. Rowe Price-group-lead-last-quarter-price-share-average-increase. However, when the domain general tags of <company> and <time> are applied, the semantic term T. Rowe Price is now tagged and replaced with the <company> tag and the terms "last" and "quarter" are tagged and replaced with the <time> tag. Since the word "last" describes "quarter," the <time> tag replaces both words. Therefore, the modified sentence for sentence (2) is <company>-group-lead-<time>-price-share-average-increase. This process is done for each sentence within the corpus. For instance, utilizing the extracting and applying steps to sentences (1) and (3), the plurality of modified sentences for sentences (1-3) is:

1.  consensus-recommendation-service-financial-peer-group-buy
 2. <company>-group-lead-<time>-price-share-average-increase
 3. increase-project-off-<time>

The plurality of modified sentences may then be stored in content database 124. Once creation of the plurality of modified sentences is complete, the process advances to step 206.

In step 206, the plurality of modified sentences is clustered into one or more conceptual units by template module 141. Each of the one or more conceptual units is associated with one or more templates. In addition, each of the one or more templates corresponds to one of the plurality of modified sentences. In a preferred embodiment, the modified sentences are clustered using the k-means clustering technique. The k-means clustering technique is an unsupervised learning algorithm that classifies a given data set (e.g., a set of sentences) through a certain number of k clusters. The algorithm is composed of the following steps: 1) place k points into the space represented by the sentences that are being clustered (these points represent initial group centroids), 2) assign each sentence to the group that has the closest centroid, 3) when all of the sentences have been assigned, the positions of the k centroids are recalculated and 4) repeat steps 2 and 3 until the centroids no longer move. The k value is initially determined by an individual running the clustering technique. For instance, in the financial domain corpus, assume k is initially set to fifty (50) clusters. Using the k-means clustering algorithm provided above and given an exemplary set of sentences in the financial corpus, the algorithm outputs fifty (50) clusters. In some embodiments, the k clusters are manually checked to determined consistency (e.g., that all modified sentences assigned to a cluster convey the same or similar semantic concept). During the manual check, a determination may be made that some of the clusters should be combined, hi some embodiments, an individual can combine the necessary clusters. For example, a determination may be made that 12 of the clusters should be combined. Therefore, there would be thirty-eight (38) clusters where each cluster represents a conceptual unit for the financial domain. In other embodiments, if the number of clusters using the initial k value is too large or small, then a different k value may have to be used. This trial and error process happens until an acceptable number of clusters is achieved.

Returning to the three modified sentences from the earlier example, if the k-means clustering is applied to those modified sentences, then a determination is made that each modified sentence belongs to a separate conceptual unit. This determination is memorialized by assigning a conceptual unit identifier to each modified sentence and corresponding original sentence. In some embodiments, a domain specific tag may also be applied to the original sentences after the clustering. For example, after clustering, the three previous modified sentences and their corresponding original sentences are assigned a conceptual unit identifier, {CuIDXXX}.

{CuID001} The consensus recommendation for the financial services peergroup is a buy.
    {CuID001} consensus-recommendation-service-financial-peergroup-buy
    {CuID002} T. Rowe Price led the group last quarter with a 3.6% average per share price increase.
    {CuID002}<company>-group-lead-<time>-price-share-average-increase
    {CuID003} The increase is projected to level off during the current quarter.
    {CuID003} increase-project-off-<time>

In addition, the domain specific tagging is applied, via template module 141, to the original sentences along with the domain general tags. The terms that the tags replace, however, is extracted and stored in content database 124. These extracted terms may be used for testing purposes later on. After the domain tags, both specific and general, are applied to each of the original sentences, the tagged original sentence is now considered a template. In addition, because each original and modified sentence has an assigned conceptual unit identifier, the templates can be grouped according to CuID. Therefore, each of the conceptual units is associated with one or more templates and each template corresponds to one of the set of sentences. Exemplary templates for the three sentences are:

a. {CuID001}: The consensus recommendation for the [industry] is a [recommendation].
    b. {CuID002}: [company] led [indnstry] [time] with a [value] [financial] [movement].
    c. {CuID003}: The movement is projected to level off during time In some situations, there are duplicate templates within a given conceptual unit. In some embodiments, the duplicate templates are kept within the conceptual unit and stored in content database 124. In a preferred embodiment, the duplicate templates are removed so that only one template is representative. Therefore, a given template may be associated with one or more original sentences. Steps 202-206 are considered pre-processing, steps. How to select a template from a given conceptual unit is determined relative to a ranking model. In order to develop a ranking model, the process continues to step 208.

Steps 208-214 describe the process needed to develop (e.g., train) a ranking model via training module 142. An exemplary ranking model uses a set of model weights to rank the templates within each conceptual unit. For example, if {CuID001} has twenty (20) templates, one needs to determine which template should be used. Ultimately, a ranking model has a determined set of model weights that are applied to each template. A score for each template is calculated and the templates are ranked according to their scores. However, before the ranking model can be used, the set of model weights needs to be determined. Steps 208-214 discuss how to determine those model weights.

In step 208, a gold template is determined by training module 142. For training purposes, each sentence within the corpus is considered. When a given sentence is chosen, it has a corresponding template and that corresponding template is the gold template for the given iteration. For example, assume there are five (5) documents, each document with ten (10) sentences. Therefore, there are fifty (50) sentences for the entire corpus. Training module 142 uses the first sentence of the first document and retrieves the corresponding template for that sentence in content database 124. That corresponding template then becomes the gold template for that iteration. In some embodiments where the templates have been de-duplicated, one or more sentences may have the same corresponding template. For instance, given that in the current example, there are fifty (50) sentences for the corpus, there will be fifty (50) iterations of gold templates even though some sentences have the same template. Even if some sentences have the same template, this information is beneficial during step 214. Once a gold template is determined by the training module 142, the process continues to step 210.

In step 210, a set of matching templates is identified, via training module 142, from the one or more templates within a given conceptual unit. The set of matching templates is associated with the gold template. For example, if the gold template is from {CuID001}, all of the potential matching templates come from the same conceptual unit identifier {CuID001}. In addition, the gold template has certain domain tags associated with it. The set of matching templates must not only be from the same conceptual unit, they must also have the exact same type and number of domain tags. For instance, if an assumption is made that the three templates below are part of the same CuID and the first one is the gold template, identification is needed as to whether the remaining two templates are matching templates to the given gold template.

a. GOLD: The consensus recommendation for the [industry] is a [recomendation].
    b. TEMP1: [company] led [industry] [time] with a [value] [financial] [movement].
    c. TEMP2: The [movement] is projected to level off during [time].

The gold template has two domain tags: <industry> tag and <recomendation> tag. Therefore, a comparison is done to see if the other templates have the exact same type and number of domain tags. TEMP1 has an <industry> tag. However, TEMP1 does not have a <recommendation> tag. In addition, TEMP1 has additional tags that are not within the gold template. Therefore, TEMP1 is not a matching template. Applying that same logic, TEMP2 is also not a matching template although it has two domain tags, the type of domain tags are not the same. This process continues with a gold template and each template within the conceptual unit being assessed for whether or not the given template is a matching template to the gold. Once the set of matching templates is determined for a given gold template, the process moves to step 212.

In step 212, the set of matching templates are ranked by training module 142. The ranked set of matching templates is associated with the gold template. In a preferred embodiment, the matching templates for a given gold template are ranked using a Levenshtein distance from each matching template to the gold template (see V. Levenshtein (1966) "Binary codes capable of correcting deletions, insertions, and reversals" Soviet Physics Doklady 10, 707-710). The Levenshtein distance between two strings (e.g., two templates) is defined as the minimum number of edits needed to transform one string into the other, with the allowable edit operations being insertion, deletion, or substitution of a single character. For example, the Levenshtein distance between "kitten" and "sitting" is three (3), since the following three (3) edits change one into the other, and there is no way to do it with tower than three (3) edits:

1. kitten→sitten (substitution of 's' for 'k')
    2. sitten→sittin (substitution of 'i' for 'e')
    3. sittin→sitting (Insertion of 'g' at the end)

Referring back to the matching templates and the gold template, the Levenshtein distance is calculated for each matching template against the given gold template. If the Levenshtein distance is low, the rank of the given matching template is high. For example, if the distance for three (3) matching templates is 4, 5, and 9, respectively then the matching template with a score of 4 is the first ranked template, the matching template with a score of 5 is the second ranked template and so on. One skilled in the art would appreciate that other methods may be used to accomplish a ranking score. After the set of matching templates for a given gold template is ranked, steps 208-212 may be reiterated for each sentence within a corpus. For example, if the entire corpus has fifty (50) sentences, there would be fifty (50) iterations of gold templates. Therefore, there would be fifty (50) iterations of steps 208-212. Each ranked set of matching templates along with the ranking scores may be stored in content database 124 for later retrieval.

In addition, the training module 142 calculates a set of ranking features for each matching template in the ranked set of matching templates. As explained above, since there may be more than one gold template, there may be more than one ranked set of matching templates. The set of ranking features is calculated for each ranked set of matching templates. A set of ranking features may include (1) position in text as a proportion of the total text, (2) type and number of domain tags, (3) n-grams, (4) template length and (5) domain tag overlap between current template and the gold template. A value for each feature is calculated for each sentence within the corpus via the training module 142. Each ranking feature calculation is discussed herein. The position feature determines where in a given document the given sentence corresponding to a given matching template is in relation to the whole text. For example, if the given ranked matching template corresponds to the fourth (4th) sentence within a document of ten (10) sentences, then the position value for the given sentence is (4/10)=0.4. The type and number of domain tags is a calculation of how many domain tags are in a given ranked matching template. For example, the ranked matching template may have two domain specific tags: <recommendation> and <industry> and two domain general tags: <company> and <company>. Since the <company> tag is indicated twice, the domain tag feature would indicate that there is one (1) recommendation, one (1) industry and two (2) company tags. The n-gram calculation determines how many combinations there are given the n-grams. For example, assuming the n-gram calculation was a 3-gram, the calculation would determine how many three (3) word consecutive combinations there are in the given matching template. For instance, the template "The consensus is <recommendation>". "The consensus is" is first three (3) word combination and "consensus is <recommendation>" is a second three (3) word combination. Therefore, the 3-gram calculation for the given sentence is 2. In some embodiments, the n-gram calculation may be one or more n-grams such as 1-gram, 2-gram, 3-gram, and the like. The template length feature is a word count for the corresponding template related to the given sentence. The content overlap calculation determines the overlap of words between the given gold template and the given sentence. To illustrate, below is one gold template and a matching template.

a. GOLD: The consensus recommendation for the [industry] is a [recommendation].
b. TEMP1: [recommendation] is the recommendation for the [industry].

One skilled in the art would appreciate that there are various ways to calculate content overlap. In some embodiments, the content overlap calculation is determined by the following equation;

$$\text{Content Overlap} = \frac{\text{\# Of Common Words Or Tags}}{\text{Minimum Template Length}}$$

Applying that equation to the two templates above, there are seven (7) common words/tags (the, recommendation, for, the, [industry], is, [recommendation]). Since the two templates have different template lengths, the template with the minimum length is chosen. In this example, TEMP1 has the minimum template length with seven (7) words/tags. Now using those values for the equation:

$$\text{Content Overlap} = \frac{\text{\# Of Common Words Or Tags}}{\text{Minimum Template Length}} = \frac{7}{7} = 1$$

with # of common words=7 and minimum template length=7. Thus, the content overlap calculation for this example is 1. In other embodiments, the content overlap calculation is determined by the following equation:

$$\text{Content Overlap} = \frac{\text{\# Of Common Words Or Tags}}{(\text{Gold Template Length} + \text{Matching Template Length} - \text{\# Of Common Words Or Tags})}$$

With the # of common words=?, gold template length=–9, and matching template length=?, the equation is:

$$\frac{\text{\# Of Common Words Or Tags}}{(\text{Gold Template Length} + \text{Matching Template Length} - \text{\# Of Common Words Or Tags})} = \frac{7}{9} = 0.78$$

While the second approach is a more fine grained, either content overlap calculation may be used as a ranking feature. Once each ranked matching template, from the one or more ranked sets of matching templates, has a set of ranking features calculated, the process progresses to step 214.

In step 214, the set of model weights are determined via the training module 142. The set of model weights are based on one or more ranked sets of matching templates and a set of ranking features. A ranking support vector machine (SVM) is used to determine a set of model weights. The ranking SVM ingests the information regarding the ranked set of matching templates and the set of ranking features and determines the model weights that are best for the given ranking purpose. In some embodiments, the set of model weights are the weight values for each of the set of ranking features. For example, after the ranking SVM is used, some ranking features are weighted more/less than others based on the SVM calculations. Therefore, the model weights help determine which ranking features are more significant than others. Now knowing the set of model weights, a ranking model is developed through the training of gold templates and matching templates.

Once the ranking model is complete, it may be used to generate natural language text for a given domain. FIG. 2A illustrates steps for generating natural language text from a statistically generated template. In some embodiments, a statistically generated template may be generated by following steps 202-206. Since steps 202-206 are considered pre-processing steps, an assumption is made in method 200A that the statistically generated templates were already created and stored in content database 124 which in turn is stored in memory 122. Prior to commencing method 200A, a set of information associated with a record is received via ranking module 143 and stored in content database 124. A record is an information source relating to one or more domains. In particular, the record is associated with a set of information regarding one or more events and/or topics around a given domain. If the set of information includes more than one event/topic, one skilled in the art would appreciate that known techniques may be used to determine the beginning and/or end of the event/topic information. For example, the information may already be tagged to indicate the different events/topics. In another example, an application may be used to indicate the different events/topics. The application can determine, for example, for every company name there is a corresponding buy/sell recommendation. Therefore, the application can tag each company/recommendation pair as a separate event within the record. In addition, the record may be transmitted, via a wireless or wireline transmission channel (not shown), from a given source (not shown). For example, a record may be created by a third party and/or internally and transmitted to system 100, in particular, ranking module 143. In staying with a financial domain example, an exemplary record is associated with a set of information regarding a buy/sell stock event of a company. The set of information includes a company name and a corresponding recommendation to buy/sell stock. This set of information may be tagged similarly to tagging techniques described earlier. For example, if the set of information is (Amazon; buy) a tag may be Amazon=<company> and buy=<recommendation>. The set of information may be tagged before or after being received by system 100, in particular ranking module 143, and processed by method 200A. Either way, method 200A must now generate a set of natural language text to articulate the set of exemplary information. Accordingly in steps 220 and 222, first and second statistically generated templates are identified, respectively, via the ranking module 143. Each of the first and second statistically generated templates should match a set of domain tags. For instance, in the previous example, the set of tagged information is Amazon=<company> and buy=<recommendation>. Steps 220 and 222 identify a first and second statistically generated template wherein each template has only the two domain tags of <company> and <recommendation>. In a preferred embodiment, a further filter is applied to narrow down the identification of the templates. This filter is a pre-determined conceptual unit. For example, if it is known that CuID012 exemplifies the concept that needs to be expressed, then the first and second statistically generated template may each be identified within CuID012 along with the two domain tags of <company> and <recommendation>. This further filter allows for more precise and accurate template identification if the conceptual unit is known. In addition, while the previous example refers to identifying a first and a second, in some embodiments, the identification of templates can be a plurality of templates beyond two. Once the identification of the first and second statistically generated template is complete, the process advances to step 224.

In step 224, the first statistically generated template is selected instead of the second statistically generated template. In order to evaluate the first and second templates, each of the templates is ranked according to the ranking model previously developed. Based on that ranking, a selection of templates occurs. In a preferred embodiment, the highest ranked template is selected. In other embodiments, a random selection of a ranked template may also occur. Either way, a template is selected and the process moves to step 226.

In step 226, a set of natural language text is generated via ranking module 143 and stored in content database 124. The generation of natural language text includes inserting a set of information associated with a record into the first statistically generated template. In step 224, a template is selected. Now the process takes the set of information received in the previous example and inserts that information into the template. For example, the following template is selected: "The consensus recommendation for [company] stock is a [recommendation]." The set of information given is Amazon=<company> and buy=<recommendation>. Therefore, by inserting the information into the template the following set of natural language text is generated: "The consensus recommendation for Amazon stock is a buy." After the information is inserted into the template to generate a set of natural language text, the process advances to step 228.

In step 228, the set of natural language text is provided via the delivery module 144. For example, the set of natural language text may be provided by the delivery module 144 and then sent to access device 130, through the wireless or wireline transmission channel 150, for a user to ultimately view. Using the previous example natural language text, the sentence, "The consensus recommendation for Amazon stock is a buy," is ultimately displayed to the user who can then digest and act upon the displayed information.

Domain Adaptability and Evaluation

Working Examples for Financial, Biography and Weather Domains

As discussed previously, one of the benefits of the present invention is the domain adaptability. While most of the examples given previously were in the financial domain, this section discusses not only the financial domain but also the biography and weather domains. In addition, evaluations of these domains have been done and are included within this section.

Any domain of discourse can be reduced to an expression of semantics (e.g., a modified sentence). However, the key for NLG is to find a method that allows for the extraction of the appropriate level of semantics to be useable for generation. The level of semantics can be relatively course or fine grained and this must be weighed against a number of factors (e.g., the communicative goal and the selection of content). The selection of content is relatively fixed and is based on domain specific and general tagging. As explained previously the systems and method of the present invention were used to illustrate semantic term extraction and domain tagging application for clustering purposes to create templates for the following different training corpora: financial (4), biography (5) and weather (6).

(4) Financial Training Sentences
   a. The consensus recommendation for the financial services peergroup is a buy.
   b. T. Rowe Price led the group last quarter with a 3.6% average per share price increase.
   c. The increase is projected to level off during the current quarter.
Modified Sentences
   a. CONSENSUS-RECOMMENDATION-FINANCIAL-SERVICES-PEERGROUP-BUY
   b. <COMPANY>-LED-GROUP-<TIME>-AVERAGE-SHARE-PRICE-INCREASE
   c. INCREASE-PROJECTED-LEVEL-OFF-<TIME>

Conceptual Unit Assignment with Domain Tagging and Extraction
  a. {CuID001} Information: industry: financial services peergroup; recommendation: buy
  b. {CuID002} Information: company; T. Rowe Price; time; last quarter; value; 3.6%; industry; the group; financial; average per share price; movement; increase
  c. {CuID003} Information: movement; increase; time; the current quarter
Templates
  a. {CuID001}: The consensus recommendation for the [industry] is a [recommendation].
  b. {CuID002}: [company] led [industry] [time] with a [value] [financial] [movement].
  c. {CuID003}: The [movement] is projected to level off during [time].
(5) Biography Training Sentences
  d. Mr. Mitsutaka Kambe has been serving as Managing Director of the 77 Bank, Ltd. since Jun. 27, 2008.
  e. Earlier in his career, he was Director of Market Sales, Director of Fund Securities and Manager of Tokyo Branch in the Bank.
  f. He holds a Bachelor's in finance from USC and a MBA from UCLA.
Modified Sentences
  d. <PERSON>-SERVING-MANAGING-DIRECTOR-<COMPANY>-<DATE>
  e. EARLIER-CAREER-<PERSON>-DIRECTOR-MARKET-SALES-DIRECTOR-FUND-SECURITIES-MANAGER-TOKYO-BRANCH-<COMPANY>
  f. <PERSON>-HOLDS-BACHELORS-FINANCE-USC-MBA-UCLA
Conceptual Unit Assignment with Domain Tagging and Extraction
  d. {CuID004} Information: person: Mr. Mitsutaka Kambe; title: Managing Director; company: 77 Bank, Ltd.; date: Jun. 27, 2008
  e. {CuID005} Information: title: Director of Market Sales. Director of Fund Securities, Manager; organization: Tokyo Branch; company: the Bank
  f. {CuID006} Information: degree: Bachelor's, MBA: subject: finance; institution: USC; UCLA
Templates
  d. {CuID004}: [person] has been serving as [title] of the [company] since [date].
  e. {CuID005}: Earlier in his career, [person] was [title], [title] and [title] of [organization] in [company].
  f. {CuID006}: [person] holds a [degree] in [subject] from [institution] and a [degree] from [institution].
(6) Weather Training Sentences
  g. Complex low from southern Norway will drift slowly nne to the Lofoten Islands by early tomorrow.
  h. A ridge will persist to the west of British Isles for Saturday with a series of weak fronts moving east across the north sea.
  i. A front will move ene across the northern North Sea Saturday.
Modified Sentences
  g. COMPLEX-LOW-SOUTHERN-<COUNTRY>-DRIFT-SLOWLY-NNE-LOFOTEN-ISLANDS-<DATE>
  h. RIDGE-PERSIST-WEST-<COUNTRY>-<DATE>-SERIES-WEAK-FRONTS-MOVING-EAST-NORTH-SEA
  i. FRONT-MOVE-ENE-NORTHERN-NORTH-SEA-DATE Conceptual Unit Assignment with Domain Tagging and Extraction
  g. {CuID007} Information: weather complex low; direction: southern, nne; location: Norway, Lofoten Islands; date: tomorrow
  h. {CuID008} Information: weather: a ridge, a series of weak fronts; direction: west, east; organization: location: British Isles, North Sea; date: Saturday
  i. {CuID009} Information: weather: a front; direction: ene, northern; location: North Sea; date: Saturday
Templates
  g. {CuID007}: [weather] from [direction] [location] will drift slowly [direction] to the [location] by early [date].
  h. {CuID008}: [weather] will persist to the [direction] of [location] for [date] with [weather] moving [direction] across [location].
  i. {CuID009}: [weather] will move [direction] across the [direction] [location] [date].

Three (3) subject-matter domains of discourse were evaluated: financial, biography and weather. As indicated in Table 1, the financial domain includes 1067 documents (with two (2) types of discourses (a) mutual fund reports (n=162), and (b) broker recommendations (n=905)) ranging from 1-21 sentences each. The biography domain includes 1150 documents ranging from 3-17 sentences each. The weather domain includes 1045 documents from the SumTime corpus which are created by experts for offshore oil rigs (see E. Reiter et al. (2005) "Choosing words in computer-generated weather forecasts" Artificial Intelligence 167, 137-169).

TABLE 1

Data and Cluster Distribution

|  | Financial | Biography | Weather |
| --- | --- | --- | --- |
| Documents | 1067 | 1150 | 1045 |
| Conceptual Units (CU) | 38 | 19 | 9 |
| Templates | 1379 | 2836 | 2749 |
| Average Template/CU (Range) | 36 (6-230) | 236 (7-666) | 305 (6-800) |

For each domain, the corpus was processed, identified semantic terms were extracted (e.g., content words such as nouns, non-copular verbs, adjectives and adverbs) and domain general tags were applied (e.g., company, person and date) to create a plurality of modified sentences. Each modified sentence was grouped using k-means clustering with k set to fifty (50) for the financial domain and one hundred (100) for the biography and weather domains. The resulting clusters were manually checked to determined consistency (e.g., that all modified sentences assigned to a cluster conveyed the same or similar semantic concept). To this end, k was initialized to an arbitrarily large value to facilitate collapsing of similar clusters during error analysis. This was assumed an easier task than reassigning individual elements from existing clusters. As indicated in Table 1, this proved to be useful as the most semantically varied domain turned out to be the financial domain with thirty-eight (38) clusters (a cluster representing a "conceptual unit"). The biography and weather domains, despite being human generated, were semantically less interesting, nineteen (19) and nine (9) conceptual units, respectively. However, the biography and weather domains did exhibit significantly more variability with the average number of templates per conceptual unit being 236 and 305, respectively, as compared to thirty-eight (38) for the financial domain. That conclusion is somewhat expected given that the biography and weather domains are human generated, but focus on a narrow subject matter. Table 2 provides five (5) example clusters (e.g., a cluster may be considered a conceptual unit) from each domain.

TABLE 2

Sample clusters via k-means clustering

| | 1 | 2 | 3 | 4 | 5 |
|---|---|---|---|---|---|
| Financial Clusters | | | | | |
| Predicates | recommend consensus company | revision downward upward | analyst provide estimates | analyst week estimate | peer group recommend |
| | strong buy | quarter week | time number | high low | consensus time |
| Biography Clusters | | | | | |
| Predicates | person position company join date | previous position company person served | resign position company date person | hold degree person from institution | previous company experience person date |
| Weather Clusters | | | | | |
| Predicates | complex pressure low high movement | ridge pressure low high direction | front associated cold movement location | trough atlantic frontal direction location | pressure front high low location |

The result of the semantic preprocessing is a training corpus reduced to templates organized by conceptual unit. How to select a template from the semantic concept is determined relative to a ranking model.

The sentences from each domain were split into two groups-training and testing. The reason for the split is one group is used to train the ranking model and the other group to test the developed ranking model. The financial and biography documents were split roughly 70% of documents for training and 30% for testing (financial: 700/367; biography; 800/350; weather: 745/300). The training documents are represented as a series of conceptual units. A set of matching templates is identified from a given conceptual unit. Templates matching a set of domain tags are first retrieved from the conceptual unit's template bank (e.g., content database 124) and then ranked based on the Levenshtein distance from the gold template. The number of possible templates was restricted to twenty (20) to ease processing time.

Additionally, a set of ranking features are associated with each ranked template. For example, a set of ranking features may include (1) position in text normalized as a proportion of the total text, (2) 1-3 grams and (3) template length. Weights are assigned to each feature based on the outcome of a ranking SVM.

In testing, each sentence of the testing document contains a conceptual unit and associated content. The templates in the conceptual unit are filtered based on the content (e.g., select only those templates that match the type of domain specific tagging present in the data), then model weights are assigned to each ranking feature in each template. The highest scored template is then selected for natural language text generation. The next section discusses the generated natural language texts and a series of automatic and human (crowd-sourced) evaluation tasks.

Table 3 provides natural language text generation comparisons for the system (Sys), the random (Rand) and the original (Orig) text from each domain. The system is machine generated natural language text chosen by the systems and methods described earlier in the specification. The random is also machine generated natural language text chosen at random within a given conceptual unit (no model weights used). The original is the original natural language text from the given domain corpus. The variability of the generated natural language texts range from a close similarity to the original texts to slightly shorter, which is not uncommon for NLG systems. The generated natural language text can be equally informative and semantically similar to the original texts (e.g., the financial natural language text in Table 3). The generated natural language text can also be less informative, but semantically similar to the original texts (e.g., leaving out "manager" in Biography Sys). However, there can be a fair amount of "gradient" semantic variation (e.g., moving northeast to a location vs. moving northeast across a location, Weather Sys, and Director of Sales Planning vs. Director of Sales, Biography Rand).

TABLE 3

Example Natural Language Text

| System | Natural Language Text (Human or Machine Generated) |
|---|---|
| Financial Orig | Funds in Small-Cap Growth category increase for week. |
| Financial Sys | Small-Cap Growth funds increase for week. |
| Financial Rand | Small-Cap Growth category funds increase for week. |
| Weather Orig | Another weak cold front will move ne to cornwall by later friday. |
| WeatherSys | Another weak cold front will move ne to cornwall during friday. |
| Weather Rand | Another weak cold front from ne through the cornwall will remain slow moving. |
| Biography Orig | He previously served as Director of Sales Planning and Manager of Sendai Loan Center. |
| Biography Sys | He previously served as Director of Sales in Sendai Loan Center of the Company. |
| Biography Rand | He previously served as Director of Sales of the Company. |

Some semantic differences are introduced in the hybrid system despite generating grammatical sentences (e.g., "remain slow moving" (Weather Rand) is not indicated in the original text). These types of differences, which are clearly problematic for NLG systems, tend to occur most in the random rather than system generations. However, there are different levels of evaluation that inform the performance of an NLG system.

NLG systems are typically evaluated by automatic metrics, human metrics and the correlations between them. The human evaluations can (and, in some circumstances, should be) performed by both non-experts and experts. Non-expert evaluations are provided to determine grammatical, informative and semantic appropriateness. The automatic metrics such as Bilingual Evaluation Understudy (BLEU), Metric for Evaluation of Translation with Explicit Ordering (METEOR) and error rate originate from machine translation research. BLEU-4 measures the degree of 4-gram overlap between documents. METEOR uses a unigram weighted f-score minus a penalty based on chunking dissimilarity. Error rate is an exact match between strings of a document. Chart 1 provides the automatic evaluations of financial, biography and weather domains for both random and system for all of the testing documents in each domain (financial (367); weather (209); biography (350)).

For each domain, the general trend is that random exhibits a higher error rate and a lower BLEU-4 and METEOR scores as compared to system. This suggests that the system is more informative as compared to the original text. However, scores for the financial domain exhibit a smaller difference compared to the weather and biography domain. Further, the BLEU-4 and METEOR scores are very similar. This is arguably related to the fact that the average number of templates is significantly lower for the financial discourses than the weather and biography domain. That is to say, there is a greater chance of random system selecting the same template as system. In sum, from an automatic metric standpoint, filtering templates by content and applying model weights increases performance of the natural language text generation. However, human evaluations of the natural language text are necessary to confirm what the automatic metrics indicate.

Two sets of crowd-sourced human evaluation experiments were constructed to compare against automatic metrics: (1) an understandability evaluation of the natural language text on a three-point scale: Fluent=no grammatical or informative barriers; Understandable=some grammatical or informative barriers; and Disfluent=significant grammatical or informative barriers; and (2) sentence level preference between two sets of texts (e.g., "Do you prefer Sentence A (from original) or the corresponding Sentence B (from random)"). One hundred (100) different texts and sentence pairs for system, random and original texts from each domain were used for the text understandability and sentence level preference evaluations. Chart 2 presents the human evaluations of the natural language texts. Chart 3 presents the sentence preference task. The aggregate percentage agreement for the natural language texts is 0.682 for understandability and 0.841 for the sentence level preference tasks.

In all cases, the original natural language texts in each domain demonstrate the highest comparative fluency and the lowest comparative disfluency. Further, the system texts demonstrate the highest fluency and the lowest disfluency compared to the random texts. However, the difference between the system and random for the financial and weather domains are close. Whereas, the difference between the system and random for the biography domain is much greater. This makes sense as the biography domain is human generated and, at their core, exhibit a high amount of variability. While the weather domain is also human generated and exhibits more variability compared to the financial domain, the weather domain reads more like the financial domain because of its narrow geographic and subject matter vernacular. Overall, however, this is a positive result for the hybrid approach and system.

Similar trends are demonstrated in the sentence preferences (see Chart 3). In all cases, the original and system sentences are preferred to random. The original sentences are also preferred to system sentences, but the difference is very close for the financial and weather domains. This indicates that, at the sentence level, the system is performing similar to the original texts.

Extreme cases aside, there is no exact formula for translating automatic and human evaluations to a true estimation for how the generated natural language texts are performing. It is a relative determination at best and, in all actuality, deference is paid to the human evaluations. Human understandability of the natural language texts is key. As illustrated in Table 4, it is important to reconcile the human and automatic performance.

TABLE 4

Human-Automatic Pearson Correlation.

| | ERROR RATE | BLEU-4 | METEOR | DISFLUENT | UNDERSTAND | FLUENT |
|---|---|---|---|---|---|---|
| ERROR RATE | 1 | ~.976 | ~.824 | .783 | .766 | ~.914 |
| BLEU-4 | | 1 | .921 | ~.849 | ~.626 | .841 |
| METEOR | | | 1 | ~.960 | ~.380 | .688 |
| DISFLUENT | | | | 1 | .413 | ~.751 |
| UNDERSTAND | | | | | 1 | ~.910 |
| FLUENT | | | | | | 1 |

Pearson correlation takes two unique values and determines if there is a correlation between them. For example, the error rate and BLEU-4 are two unique values. The Pearson correlation technique illustrates whether there is a correlation and if the two values are trending around the same rate. In the current example, the Pearson correlation value is −0.976. The negative indicates that the two values are trending the opposite direction (e.g., one is increasing the other is decreasing). The overall Pearson correlation value 0.976 indicates a strong correlation between the two values. From Table 4, a few observations may be noted. The Pearson correlates between the automatic metrics is high with the appropriate direction (e.g., a high error rate should correlate negatively with a low BLEU or METEOR score). Fluent and Disfluent ratings also correlate well with automatic metrics—increased fluency corresponds to increased BLEU and METEOR scores and decreased error rate scores and vice-versa. The intermediate Understandable rating does not seem to correlate well and is potentially an artifact of the crowd-sourced task, i.e., the parameters of the Understandable category required more time to process, or humans prefer to choose more binary categories.

In summary, a hybrid statistical and template-based NLG system creates acceptable natural language texts for a number of different domains. From a resource standpoint, it is an attractive proposition to have a method to create NLG texts for a number of different subject matters with a minimal amount of development. The initial generation of the conceptual units and templates for the financial domain took two people one week. This was reduced to two days for the weather and biography domains. Most of the development time was spent on domain specific tagging and model creation. However, all told, only two person months were required. This investment is significantly lower than, for example, the SumTime corpus needed 12 person months for micro-planning and realization alone.

A Statistical NLG Framework for Aggregated Planning and Realization

A typical NLG system contains three main components: (1) Document (Macro) Planning—deciding what content should be realized in the output and also how the content is structured; (2) Sentence (Micro) planning—generating a detailed sentence specification and selecting appropriate referring expressions; and (3) Surface Realization—generating the final text after applying morphological modifications (see e.g., Bateman and Zock, 2003; Reiter and Dale, 2000; McKeown, 1985). However, Document Planning is arguably one of the most crucial components of an NLG system and is responsible for making the text have a more coherent structure. If a NLG system fails in the document planning stage, the communicative goal of the generated text will not be met even if the other two stages are perfect. While most traditional systems simplify development by using a pipelined approach where (1-3) are executed in a sequence, this can result in errors at one stage propagating to successive stages. The inventors propose a hybrid framework that combines (1-3) converting data to text in one single process.

Most NLG systems fall into two broad categories: knowledge-based and statistical. Knowledge-based systems heavily depend on having domain expertise to come up with handcrafted rules at each stage of a NLG pipeline. Although knowledge-based systems can produce high quality text, they are (1) very expensive to build, involving a lot of discussion with the end users of the system for the document planning stage alone; (2) have limited linguistic coverage, as it is time consuming to capture linguistic variation; and (3) one has to start from scratch for each new domain. Statistical systems, on the other hand, are fairly inexpensive, more adaptable and rely on having historical data for the given domain. Coverage is likely to be high if more historical data is available. Statistical systems are more prone to errors and the output text may not be coherent as there are less constraints on the generated text. Our framework is a hybrid of statistical and template-based systems. Many rule-based systems use templates to generate text. A template structure contains "gaps" that are filled to generate the output. Therefore, it is advantageous to create a lot of templates from the historical data and select the right template based on some constraints.

Typically. NLG systems are rule-based and, as mentioned above, have a pipelined architecture for the document and sentence planning stages and surface realization (Hovy, 1993; Moore and Paris, 1993). However, document planning is arguably the most important task (Sripada et al., 2001). If follows that approaches to document planning are rule-based as well and, concomitantly, are usually domain specific. For example, Bouayad-Agha, et al. (2011) proposed document planning based on an ontology-based knowledge base to generate football summaries (Bouayad-Agha et al., 2011).

Statistical approaches in general look to avoid extensive processing time by relying corpus data to "learn" rules for one or more components of an NLG system (Langkilde and Knight, 1998). For example, Duboue and McKeown (2003) proposed a statistical approach to extract content selection rules to generate biography descriptions (Duboue and McKeown, 2003). Further, statistical approaches should be more adaptable to different domains than their rule-based counterparts (Angeli et al., 2012). For example, Barzilay and Lapata (2005) formulated content selection as a classification task to produce summaries of football games (Barzilay and Lapata, 2005). Kelly (2009) extended Barzilay and Lapata's approach for generating match reports for the game of cricket (Kelly et al., 2009).

In order to generate text for a given domain, the system of the present invention runs the input data through a statistical ranking model to select a sequence of templates that best fit the input data. In order to build this model, our system runs the historical data (corpus) for the domain through four components: preprocessing, conceptual-unit creation, collecting statistics and building the ranking model. Each component is described herein.

The system is run on three different domains: financial, biography and weather. Within each domain there are one or more message types. The biography domain includes only one message type (of the same name) with 1150 human generated texts focused on corporate office biographies, ranging from 3-17 segments (period ended sentences). The financial domain includes 53 machine generated texts from a commercially available NLG system covering the message types of mutual fund performance reports. The weather domain includes a forecast message type with 1045 human generated weather reports for offshore oil rigs from the SUMTIMEMETEO corpus (Reiter et al., 2005).

Prior to the first step of the claimed method, the corpus is preprocesses to extract templates. It is assumed that each document in the corpus is classified to a message type from a given domain. Preprocessing involves uncovering the underlying semantic structure of the corpus and using this as a foundation (see e.g., (Lu et al., 2009; Lu and Ng, 2011; Konstas and Lapata, 2012)).

Each document is split in the message type into sentences (based on period-ended sentences) and create a shallow Discourse Representation Structure (following Discourse Representation Theory (Kamp and Reyle, 1993)) of each sentence. The DRS consists of semantic predicates and domain general named entity tags (currently extracted from the Boxer semantic analyzer (Bos, 2008)). In parallel, domain specific named entity tags are identified and, in conjunction with the semantic representation, are used to create templates. For example, in (1), from the biography message type, the conceptual meaning of sentences (a-b) are represented in (c-d).

(1) Sentence a. Mr. Mitsutaka Kambe has been serving as Managing Director of the 77 Bank, Ltd. since Jun. 27,

2008.

b. He holds a Bachelor's in finance from USC and a MBA from UCLA.

Conceptual Meaning c. SERVING|MANAGING|DIRECTOR|PERSON|COMPANY|DATE d. HOLDS|BACHELOR|FINANCE|COMPANY|MBA|EVENT|COMPANY The outputs of the preprocessing stage are the template bank and predicate information for each sentence in the corpus The next step is to create conceptual units for the corpus by clustering sentences. This is a semi-automatic process where we use the predicate information for each sentence to compute similarity between sentences. k-Means clustering is used with k set to an arbitrarily high value to over-generate (using the WEKA toolkit (Witten and Frank, 2005)). This allows to manually verify the generated clusters and merge them if necessary. A unique identifier is assigned called a CuId to each cluster, which represents a conceptual unit. Each template is associated in the corpus to a corresponding CuId by tracing the sentences in the clusters to the corresponding templates. For example, in (2), using the sentences in (1a-b), the identified named entities are assigned to a clustered CuId (2a-b) and then each sentence in the training corpus is reduced to a template (c-d).

(2) Content Mapping
a. {CuId: 000}—Information: person: Mr. Mitsutaka Kambe; title: Managing Director; company:
77 Bank, Ltd.; date: Jun. 27, 2008
b. {CuId: 001}—Information: person: he; degree: Bachelor's, MBA; subject: finance; institution:
USC; UCLA
Templates
c. {CuId: 000}: [person] has been serving as [title] of the [company] since [date].
d. {CuId: 001}: [person] holds a [degree] in [subject] from [institution] and [degree] from [institution].
At this stage, there is a set of conceptual units with corresponding template collections.

After identifying the different conceptual units and the template banks, a number of
statistics by message type is collected, which will be used to build a ranking model in the next step:
Frequency distribution of templates: Count of unique templates divided by the total number of templates.
Frequency distribution of CuIds by position: Count of unique CuId/position combinations (e.g., CuId001p.1, CuId001p.4, etc.) divided by the total number of CuId/position combinations.
Frequency distribution of templates by position: Count of unique
template/position combinations divided by the total number of template/position combinations.
Average number of entity tags by CuId: For all templates in a unique CuId, the
number of unique entity tags divided by the total number of entity tags.
Average number of entity tags by CuId and position: For all templates in a unique
CuId/position combination, the number of unique entity tags divided
by the total number of entity tags.
Average number of words by CuId: For all of the words (not including entity tags) in all templates in a unique CuId, the total number of words divided by the total number of templates in a given CuId.
Average number of words by CuId and position: For all of the words (not including entity tags) in all templates in a given unique CuId/position combination, the total number of words divided by the total number of templates in a given CuId.
Frequency distributions of verbs by position: Count of unique verb/position
combinations divided by the total number of verb/position combinations.
Frequency distribution of CuId sequence: Count of unique bigram and trigram sequences of
CuIds divided by the total number of bigram and trigram sequences.
Frequency distribution of template sequence: Count of unique bigram and trigram sequences of templates divided by the total number of bigram and trigram sequences.
Frequency distribution of entity tag sequence: Count of unique entity tag sequences in all templates, divided by the total number of entity tag sequences.
Min, max and average number of CuIds by document: The average, minimum, maximum number of CuIds across all documents.
This will require tracing back each sentence in a document in the corpus to a template and then to a corresponding CuId.

The core component of system of the present invention is a statistical model that ranks a set of templates for the given position based on the input data and message type. The idea is to rank all the templates from all CuIds at each position. To generate the training data, the templates are first filtered that have named entity tags not specified in the input data. This will make sure the
generated text is complete. Then templates are ranked according to the edit distance (Levenshtein,
1966) from the template corresponding the current sentence in the training document (focusing on the top 10 for ease of processing effort). For each template, the following features are generated to build the ranking model by message type:
CuId given position: This is a binary feature where the current CuId is either the same as the most frequent CuId for the position (1) or not (0).
Overlap of named entities: Number of common named entities between current CuId and most likely CuId for the position
Prior template: Probability of the sequence of template selected at the previous position and the current template (iterated for the last three positions).
Prior CuId: Probability of the sequence of the CuId selected at the previous position and the current CuId (iterated for the last three positions).
Difference in number of words: Absolute difference between number of words for current template and average number of words for CuId
Difference in number of words given position: Absolute difference between number of words for current template and average number of words for CuId at given position
Percentage of unused data: This feature represents the portion of the unused input so far.
Difference in number of named entities: Absolute difference between the number of named entities in the current template and the average number of named entities for the current position
Most frequent verb for the position: This is a binary valued feature where the main verb of the template belongs to the most frequent verb group given the position is either the same (1) or not (0).
Average number of words used: Ratio of number of words in the generated text so far to the average number of words
Average number of entities per message type: Ratio of number of named entities in the generated text so far to the average number of named entities.
Most likely CuId given position and previous CuId: This is a binary feature indicating if the current CuId is most likely given the position and the previous CuId.
Difference between the most likely template in CuId and current template: Edit distance between the current template and the most likely template for the current CuId.
Difference between the most likely template in CuId given position and current template: Edit distance between the current template and the most likely template for the current CuId at the current position.
A linear kernel is used for a ranking SVM (Joachims, 2002) (with cost set to the total number of queries) to learn the weights associated with each feature for the different message types (biographies=2534; weather=1969; financial=9856).

The first step of the claimed method is generating or creating based on a current set of input, a first automated natural language sentence.

At generation time, the system of the present invention has a set of input data, a semantically organized template (also known as statistically generated template) bank and a model from training on the documents for a given message type. To generate the initial sentence, those templates that contain a named entity tag not present in the input data are filtered out.

Then, the feature values are calculated (multiplied by that feature's weight from the model) for each of the remaining templates. The template with the highest overall score is selected and filled with matching entity tags (also known as one or more input pieces) from the input data and appended to the generated text. This exemplary process 300A is outlined in FIG. 3A.

The next step is to remove at least one of the one or more input pieces from the current set of input to form a modified current set of input. This modified current set of input comprises of at least one less input piece than the current set of input.

Before generating the next sentence, the entities used in the initial sentence generation are monitored and the decision is made to either remove those entities from the input data or keep the entity for one or more additional sentence generations. For example, in financial discourses, the name of the company may occur only once in the input data. However, it may be useful for creating good texts to have that company name available for subsequent generations. To illustrate, in (3) if we remove Ford from the input data after the initial generation, (c) becomes difficult to resolve as
it indicates an increase in stock price after indicating that the car manufacturers peer group saw a decrease in performance. If "Ford" is not removed, then the generations in (d-f) are more cohesive.
(3) Use Once and Remove
a. Ford posted stronger than expected earnings for the fourth quarter.
b. The car manufacturers peer group saw decreased performance
overall c. Average stock price moved from 23.56 per share to 24.75
per share.
Use More than Once
d. Ford posted stronger than expected earnings for the fourth quarter.
e. The car manufacturers peer group saw decreased performance overall.
f. Ford's average stock price moved from 23.56 per share to 24.75 per share.

Deciding on what type of entities and how to remove them is different for each message type. For example, some entities are very unique to a text and should not be made available for subsequent generations as doing so would lead to unwanted redundancies (e.g., stating the monthly performance of a mutual fund more than once) and, as in (3), some entities are general and should be retained. The system of the present invention possesses the ability to monitor the data usage and we can set parameters on the usage to ensure coherent generations for a given message type.

The inventors also rely on this process to generate referential expressions such as pronouns and demonstratives, which could be tagged in the training data (e.g., he getting a PERSON tag or the company a COMPANY tag). However, this is not an elegant solution as the same would not
exist in the input data. Consequently, once entities that are eligible to have a co-referential word or phrase are used (e.g., companies and persons), the entity can be replaced in the input data with a referring expression and retained in the input data. Doing this would then return "The company's average stock price moved from 23.56 per share to 24.75 per share." for sentence (3f).

Figure 3:
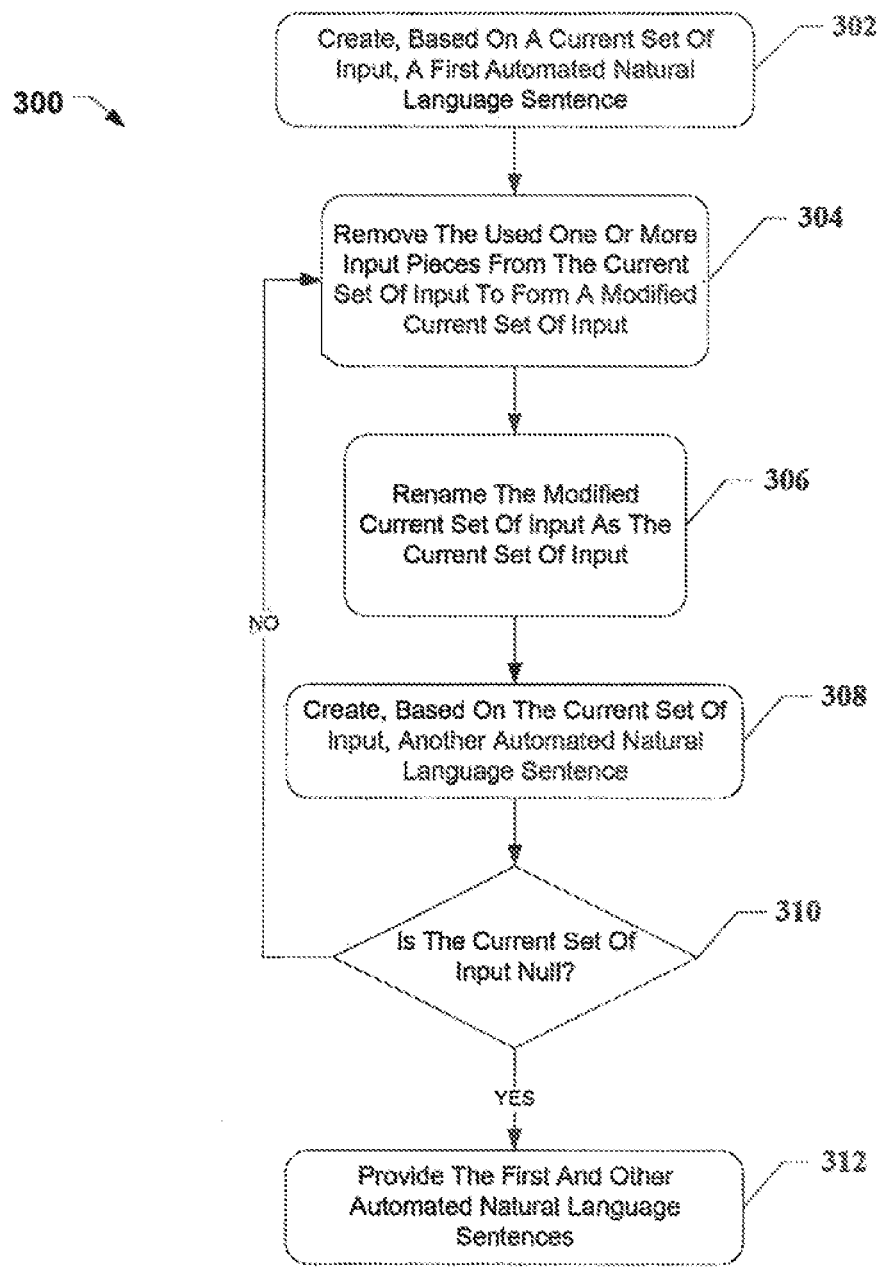
FIGS. 3-4 outline exemplary methods 300, 300A and 400 which correspond to one or more embodiments of automated multiple sentence generation.
Figure 3A:
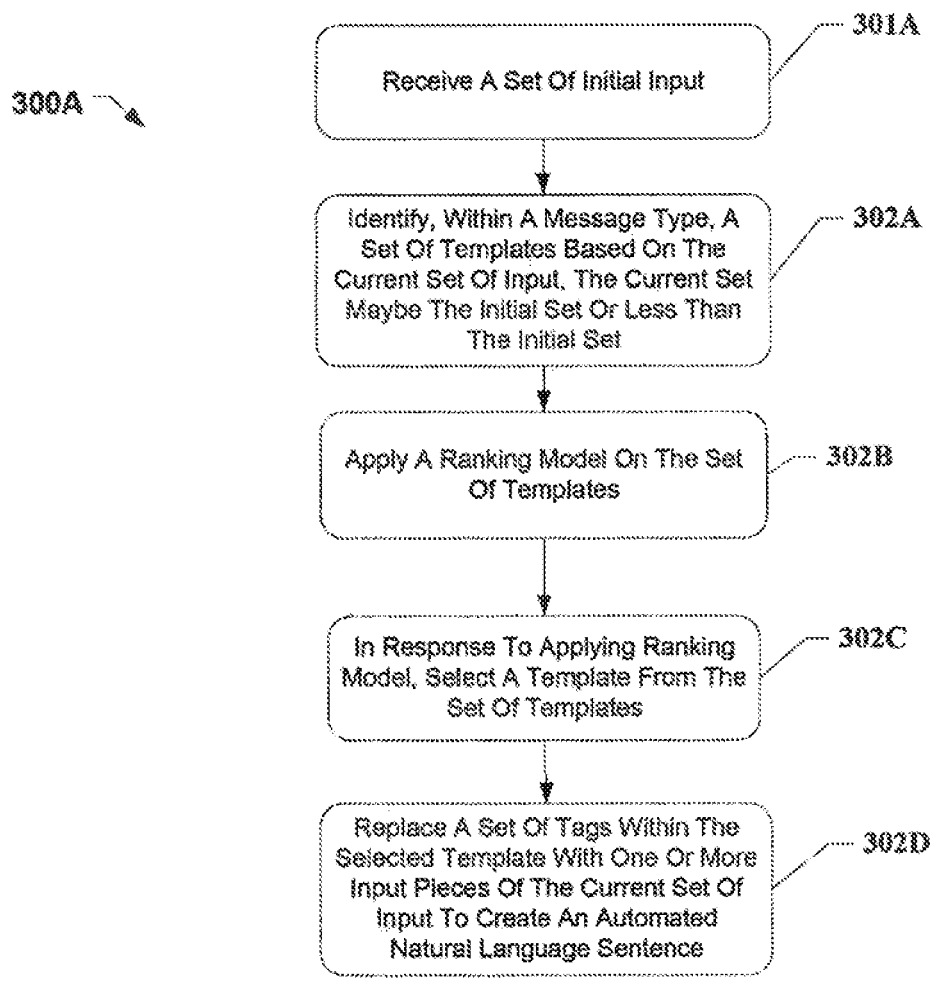
Figure 4:
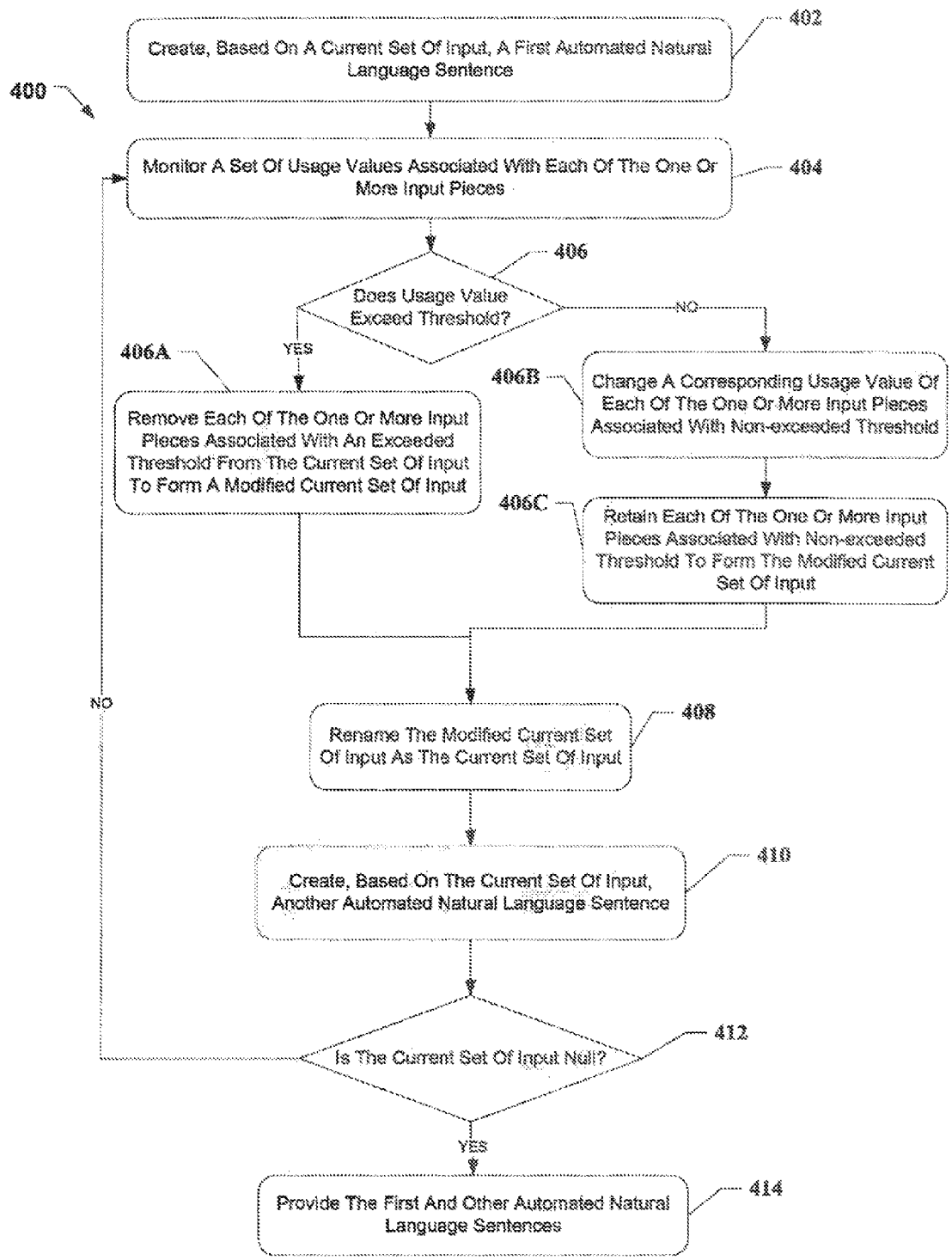
Figure 5:
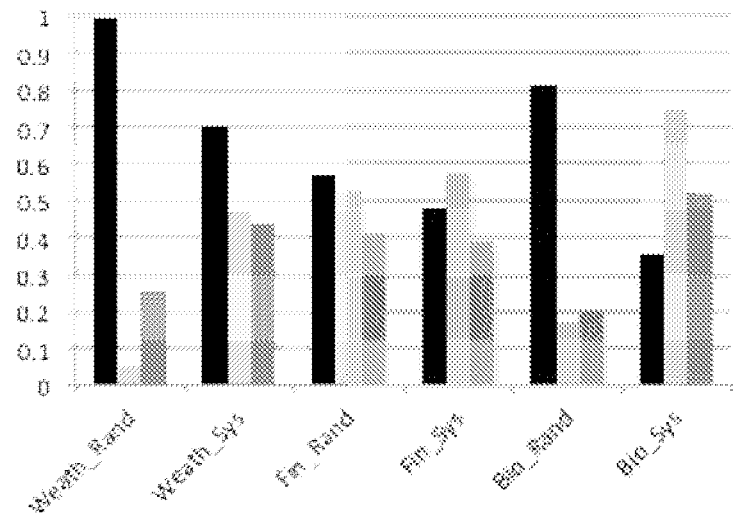
FIGS. 5-7 show various evaluations relating to the present disclosure.
Figure 6:
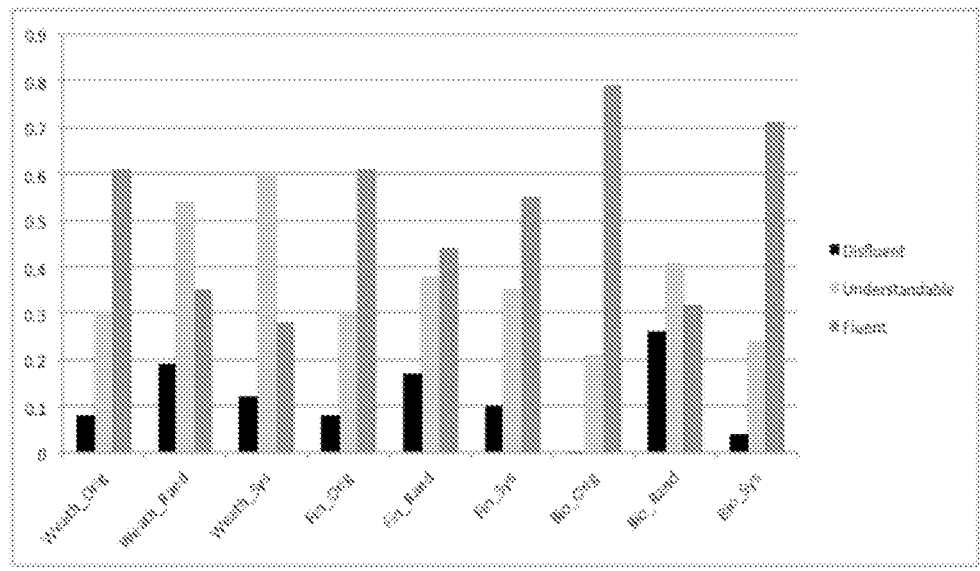
Figure 7:
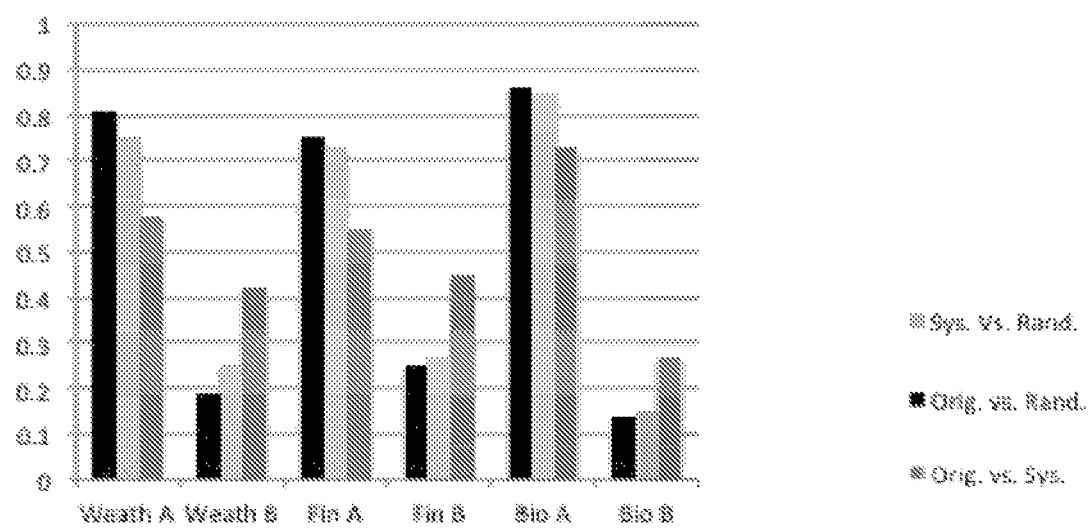

Once the input data has been modified (i.e., an entities have been removed, replaced or retained), it serves as the new input data for the next sentence generation. This process then iterates until the predetermined minimum number of sentences is reached (determined from the training corpus statistic) and then continuing until all of the remaining input data is consumed (and not to exceed the predetermined maximum number of sentences, also determined from the training corpus statistic). FIG. 3 illustrates the exemplary method 300 of only removing one or more input pieces to ultimately provide one or more automated natural language sentences. FIG. 4 illustrates the exemplary method 400 of monitoring the usage values of each of the one or more input pieces and
if the usage value exceeds a threshold, then remove the one or more input pieces to form a modified current set of input or if the usage value does not exceed the threshold, then retain the input pieces and change the usage value to ultimately provide one or more automated natural language
sentences. Either way the aforementioned paragraphs disclosure features and functionality of exemplary methods 300A, 300 and 400.

The method concludes with providing the first automated natural language sentence and the second automated natural language sentence.

The embodiments described above and in the claims are intended only to illustrate and teach one or more ways of practicing or implementing the present invention, not to restrict its breadth or scope. For example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

What is claimed is:
1. A computer-implemented method comprising:
   a. automatically creating, by a template module of a computer, based on a current set of input, a first automated natural language sentence;
   b. removing, by the template module of the computer, at least one of the one or more input pieces from the current set of input to form a modified current set of input, the modified current set of input comprising at least one less input piece than the current set of input;
   c. creating, by the template module of the computer, a second natural language sentence based on the modified set of input; and
   d. providing, by the template module of the computer, the first automated natural language sentence and the second automated natural language sentence.
2. The method of claim 1 further comprising:
   a. repeating the removing step until the current set of input is null to create one or more additional natural language sentences; and
   b. providing the one or more additional natural language sentences.
3. The method of claim 2 wherein each of the first automated natural language sentence, the second automated natural language sentence and the one or more additional natural language sentences were created by:
   a. identifying, based on the current set of input, a set of statistically generated templates, the set of statistically generated templates associated with the message type;
   b. applying a ranking model on the set of statistically generated templates;
   c. selecting, in response to applying the ranking model, a statistically generated template from the set of statistically generated templates; and
   d. replacing a set of tags within the statistically generated template with one or more input pieces of the current set of input.

4. A computer-implemented method comprising:
a. automatically creating, by a template module of a computer, based on a current set of input, a first automated natural language sentence, the current set of input comprising one or more input pieces;
b. monitoring, by the template module of the computer, a set of usage values, each usage value, within the set of usage values, associated with each of the one or more input pieces;
c. determining, by the template module of the computer, whether each usage value has exceeded a threshold and:
  i. if the threshold has been exceeded, removing, by the template module of the computer, each of the one or more input pieces associated with an exceeded threshold from the current set of input to form a modified current set of input; and
  ii. if the threshold has not been exceeded, retaining each of the one or more input pieces associated with a non-exceeded threshold to form the modified current set of input and changing, by the template module of the computer, a corresponding usage value of each of the one or more input pieces associated with the non-exceeded threshold;
d. creating, by the template module of the computer, a second automated natural language sentence based on the current set of input; and
e. providing, by the template module of the computer, the first automated natural language sentence and the second automated natural language sentence.

5. The method of claim 4 further comprising:
a. repeating the monitoring step, the determining step until the current set of input is null to create one or more additional natural language sentences; and
b. providing the one or more additional natural language sentences.

6. The method of claim 5 wherein each of the first automated natural language sentence, the second automated natural language sentence and the one or more additional natural language sentences were created by:
a. identifying, based on the current set of input, a set of statistically generated templates, the set of statistically generated templates associated with the message type;
b. applying a ranking model on the set of statistically generated templates;
c. selecting, in response to applying the ranking model, a statistically generated template from the set of statistically generated templates; and
d. replacing a set of tags within the statistically generated template with one or more input pieces of the current set of input.

7. A system comprising:
a. a computer comprising a processor and a memory coupled to the processor;
b. a program stored in the memory for execution by the processor, the program configured to:
  i. automatically create, by a template module of the computer, based on a current set of input, a first automated natural language sentence;
  ii. remove, by the template module of the computer, at least one of the one or more input pieces from the current set of input to form a modified current set of input, the modified current set of input comprising at least one less input piece than the current set of input;
  iii. create, by the template module of the computer, a second natural language sentence based on the current set of input; and
  iv. provide, by the template module of the computer, the first automated natural language sentence and the second automated natural language sentence.

8. The system of claim 7 wherein the program further configured to:
a. repeat a remove configuration until the current set of input is null to create one or more additional natural language sentences; and
b. provide the one or more additional natural language sentences.

9. The system of claim 8 wherein each of the first automated natural language sentence, the second automated natural language sentence and the one or more additional natural language sentences were created by the program, the program further configured to:
a. identify, based on the current set of input, a set of statistically generated templates, the set of statistically generated templates associated with the message type;
b. apply a ranking model on the set of statistically generated templates;
c. select, responsive to the ranking model, a statistically generated template from the set of statistically generated templates; and
d. replace a set of tags within the statistically generated template with one or more input pieces of the current set of input.

10. A system comprising:
a. a computer comprising a processor and a memory coupled to the processor;
b. a program stored in the memory for execution by the processor, the program configured to:
  i. automatically create, by a template module of the computer, based on a current set of input, a first automated natural language sentence, the current set of input comprising one or more input pieces;
  ii. monitor, by the template module of the computer, a set of usage values, each usage value, within the set of usage values, associated with each of the one or more input pieces;
  iii. determine, by the template module of the computer, whether each usage value has exceeded a threshold and:
    1. if the threshold has been exceeded, remove, by the template module of the computer, each of the one or more input pieces associated with an exceeded threshold from the current set of input to form a modified current set of input; and
    2. if the threshold has not been exceeded, retain each of the one or more input pieces associated with a non-exceeded threshold to form the modified current set of input and change, by the template module of the computer, a corresponding usage value of each of the one or more input pieces associated with the non-exceeded threshold;
  iv. create, by the template module of the computer, a second automated natural language sentence based on the current set of input; and
  v. provide, by the template module of the computer, the first automated natural language sentence and the second automated natural language sentence.

11. The system of claim 10 wherein the program further configured to:
a. repeat a monitor configuration and a determine configuration until the current set of input is null to create one or more additional natural language sentences; and
b. provide the one or more additional natural language sentences.

12. The method of claim 5 wherein each of the first automated natural language sentence, the second automated natural language sentence and the one or more additional natural language sentences were created by the program, the program further configured to:
 a. identifying, based on the current set of input, a set of statistically generated templates, the set of statistically generated templates associated with the message type;
 b. applying a ranking model on the set of statistically generated templates;
 c. selecting, in response to applying the ranking model, a statistically generated template from the set of statistically generated templates; and
 d. replacing a set of tags within the statistically generated template with one or more input pieces of the current set of input.

* * * * *